Feb. 18, 1941.  G. A. LYON  2,231,932
ORNAMENTAL RING FOR WHEELS
Original Filed June 17, 1936  4 Sheets-Sheet 1
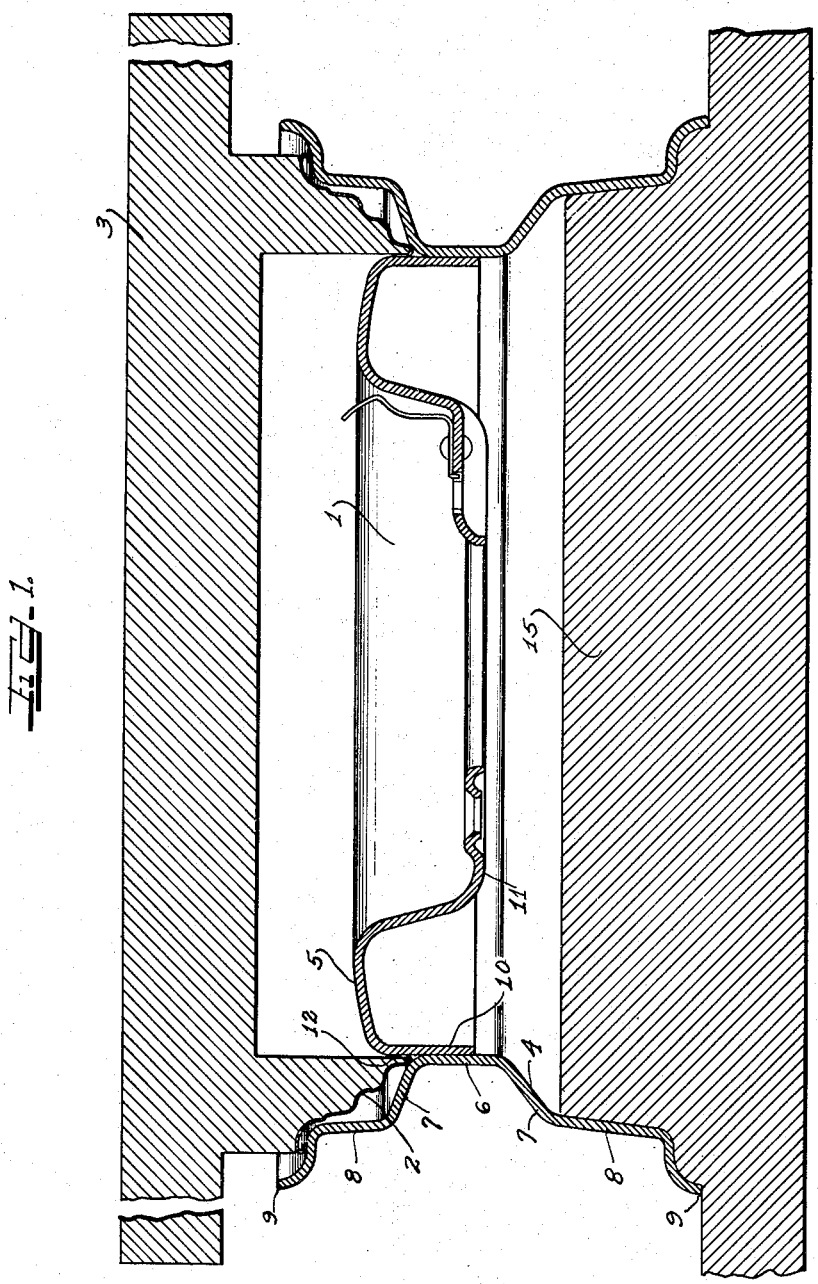
Inventor
GEORGE ALBERT LYON.
by
Attys.

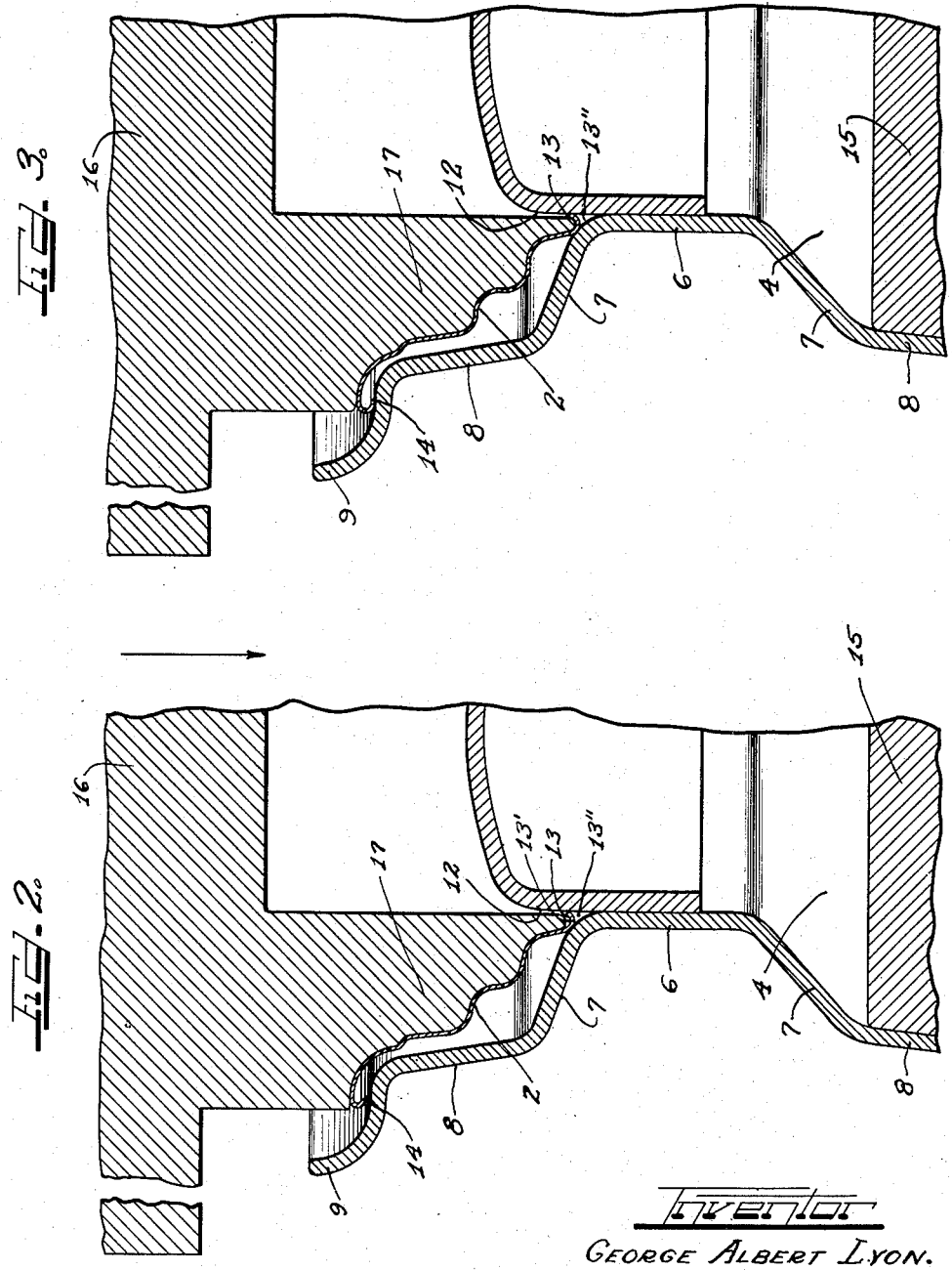

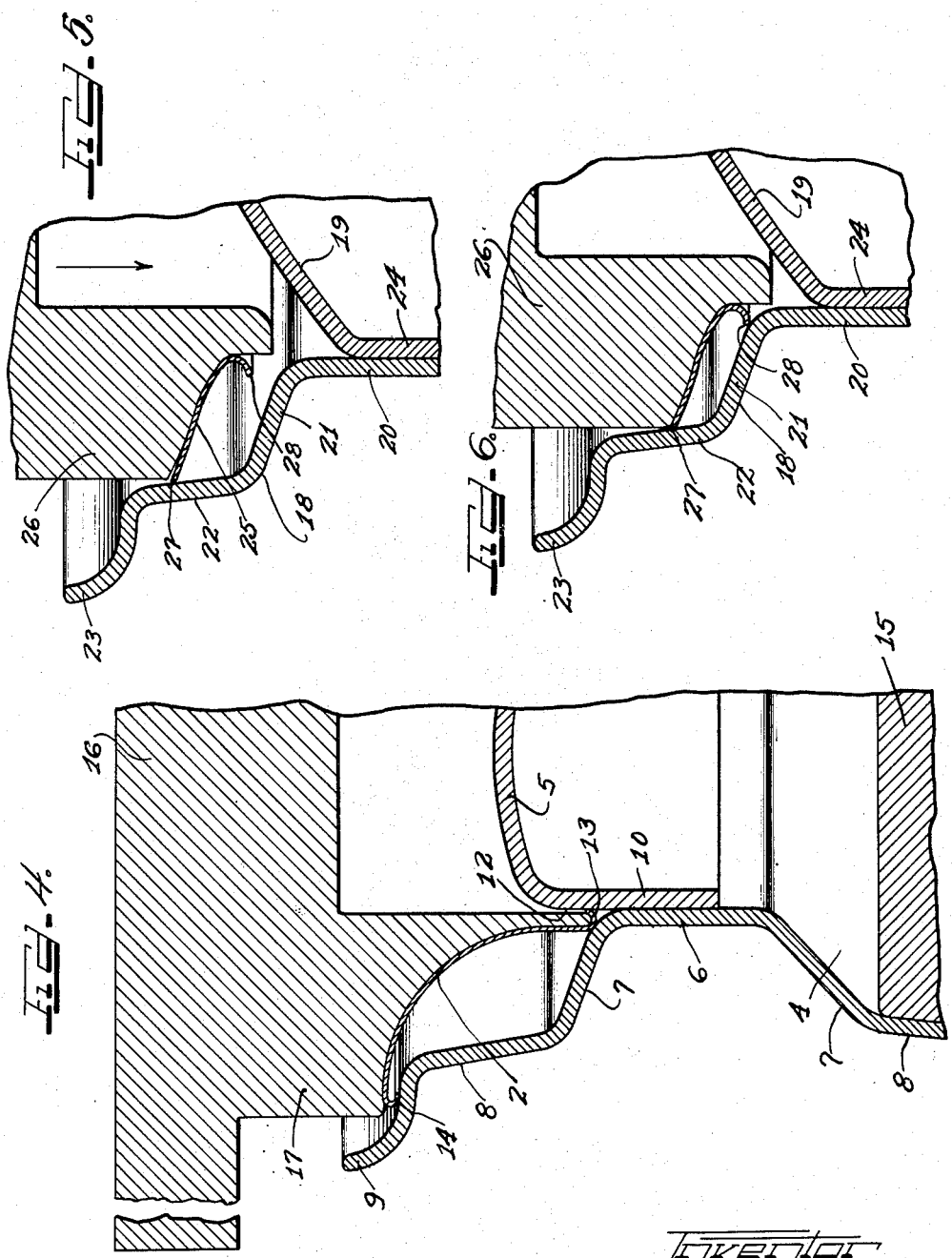

Feb. 18, 1941. G. A. LYON 2,231,932
ORNAMENTAL RING FOR WHEELS
Original Filed June 17, 1936 4 Sheets-Sheet 4
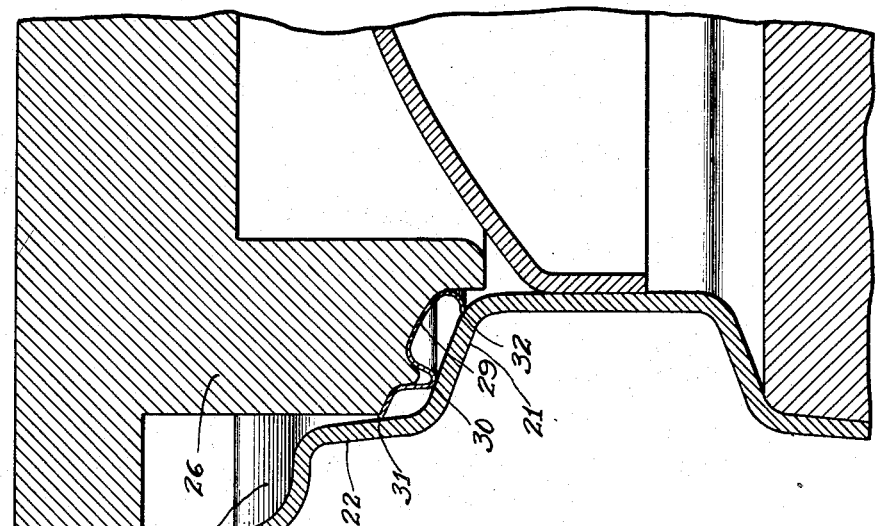
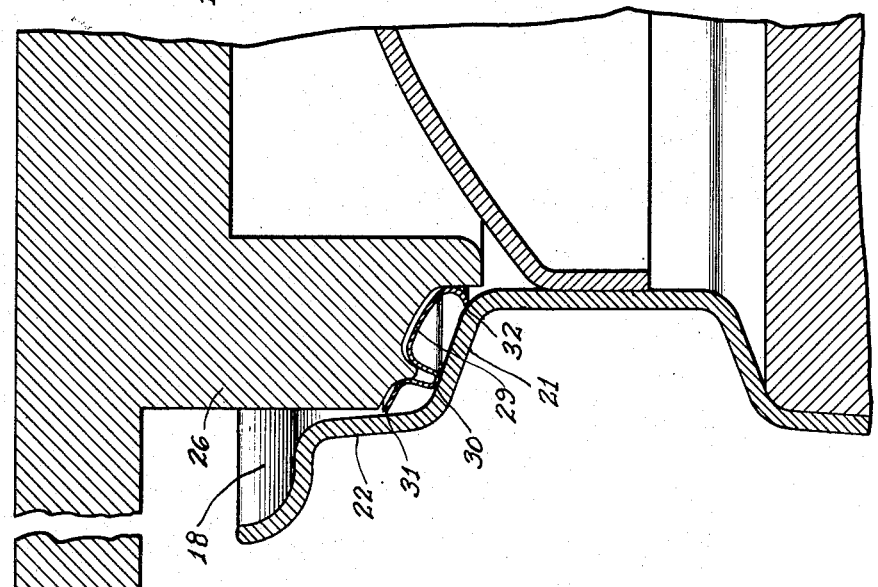
Inventor
GEORGE ALBERT LYON.
by
Attys.

Patented Feb. 18, 1941

2,231,932

UNITED STATES PATENT OFFICE 2,231,932

ORNAMENTAL RING FOR WHEELS

George Albert Lyon, Allenhurst, N. J.

Application June 17, 1936, Serial No. 85,633
Renewed June 26, 1939

10 Claims. (Cl. 41—10)

This invention relates to an ornamental device mounted on wheels and more particularly to an ornamental trim ring adapted to be disposed over a substantial portion of the outer side surface of a rim on an automobile or other vehicle wheel.

It is an object of this invention to provide a novel ornamental accessory for use with automobile or other vehicle wheels which may be so secured in position as to not require any modification or change in the wheel.

It is important in the manufacture and assembly of ornamental devices for disposition on vehicle wheels, that these devices be economical to manufacture, simple to assemble, require no changes on the usual vehicle wheel, and be rugged and reliable in use and substantially free from vibration.

It is an object of this invention to provide a novel ornamental device which possesses the above highly desirable qualities.

It is a further object of this invention to provide a novel method and means for mounting ornamental trim rings on metal wheels.

A further object of this invention is a novel method of securing a trim ring to vehicle wheels by a pressing operation.

A still further object of this invention is a novel method of securing a trim ring to vehicle wheels which includes causing one edge of the ring to be curled or slightly bent during the assembling operation, whereby the edge makes a biting engagement with the wheel.

Another object of this invention is a novel method of mounting ornamental trim rings to vehicle wheels under pressure, during which operation a substantial portion of the ring maintains its same configuration but a small portion of the ring changes its configuration to make a biting engagement with the wheel.

The novel features which I believe to be characteristic of my invention are set forth in particularity in the appended claims.

My invention itself, however, both as to its organization and method of operation together with further objects and advantages thereof, may best be understood by reference to the following description taken in connection with the accompanying drawings, in which:

Figure 1 is a cross-sectional elevational view of a wheel, a trim ring, and a press illustrating one embodiment of my invention;

Figure 2 is an enlarged view of the upper left-hand portion of Figure 1 and shows the press in its position prior to the pressing operation;

Figure 3 is an enlarged view of the upper left-hand portion of Figure 1 and shows the press in its position at the end of the pressing operation;

Figure 4 is a cross-sectional elevational view of a portion of a wheel, a trim ring and a press illustrating a slightly modified form of my invention;

Figure 5 is a cross-sectional elevational view of a different embodiment of my invention prior to the pressing operation;

Figure 6 illustrates further the embodiment shown in Figure 5 and shows the position of the trim ring and the press with respect to the wheel at the end of the pressing operation;

Figures 7 and 8 illustrate a slightly modified form of the embodiment of my invention shown in Figures 5 and 6, Figure 7 illustrating the relative position of the various elements prior to the pressing operation and Figure 8 illustrating the relative position of the elements at the end of the pressing operation.

Referring to Figure 1 of the drawings, I have illustrated therein a wheel 1 on which an ornamental trim ring 2 is about to be secured with the aid of a press 3, in accordance with the teachings of my invention. Wheel 1 is of the type commonly manufactured for use by various members of the automobile industry, although it is to be understood that my invention is not limited thereby. As shown, wheel 1 comprises a rim portion 4 and a body part 5.

Rim 4 is one of the drop center type and includes a base flange 6, opposite side wall portions 7, opposite intermediate flanges 8, and side edges 9. Body portion 5 includes a laterally extending flange 10 at its outer periphery, and a circular holding flange 11 adjacent the center of the wheel. Body part 5 is secured to rim portion 4 in any suitable manner, such as by rivets (not shown). As may be seen from careful inspection of the drawings, laterally extending flange 10 of body part 5 extends beyond the edge of base flange 6 of rim portion 4, and in consequence thereof forms a shoulder 12 at the junction point of body part 5 and rim portion 4.

In the manufacture of vehicle wheels, it is, as a general rule, impossible to give the outer side surface of the wheel a high polish or a pleasing configuration because of the necessity of using materials having the requisite stress resisting characteristics and in following a constructional design which is in accordance with sound engineering principles. Various types of ornamental devices have been provided which will enhance the general beauty and appearance of the outer side surface of the wheel. One type of ornamental device which is commonly used, is known to the art as an ornamental trim ring.

A trim ring is an ornamental device composed of sheet material which is adapted to be secured to the outer side surface of the rim on a vehicle wheel and to substantially cover the same.

In Figures 1 to 3 of the drawings, I have shown a novel form of trim ring which is adapted to be secured to a vehicle wheel in a novel manner.

In Figures 1 to 3 of the drawings, I have shown trim ring 2 as having a tortuous confiuration. It is to be understood, however, that the precise form of configuration forms no part of the present invention as the character of this configuration may vary through wide limits without departing from the spirit and scope of my invention. In accordance with my invention, trim ring 2 is preformed to some desired shape but the inner edge of trim ring 2 is curled or bent as shown at 13 in Figure 2. Ring 2 is cut to size on its inner diameter so that it can readily be placed over the outwardly extending shoulder 12 without the application of any considerable force. The outer peripheral edge 14 of trim ring 2 is underturned as at 14 for a reason which will presently be explained.

The manner of securing trim ring 2 to wheel 1 is as follows:

The wheel upon which the trim ring is about to be mounted is placed over the base member 15 of press 3. Trim ring 2 is then slipped over shoulder 12 and the male member 16 of press 3 including a die 17 which fits the ring snugly is brought into engagement with the latter.

Upon careful inspection of the drawings, it will be noted that there is a slight space 13' between the die and the inner marginal edge 13 of ring 2 as well as a substantially triangular space 13" beneath the inner marginal portion of ring 2 which permits free curling of the latter at this point during the pressing operation. As pressure is applied in an axial direction as is indicated by the arrow in the drawings, marginal edge 13 curls itself against shoulder 12 and in consequence thereof makes a biting engagement therewith. The relative position of the various elements after the pressing operation may best be seen in Figure 3. It will be noted that during the pressing operation outer marginal portion 14 of ring 2 comes in contact with the outer edge 9 of rim 4. Due to the position and the angle of the curled portion 13 of ring 2, any tendency for ring 2 to disengage itself from wheel 1 will only cause the inner edge of ring 2 to bite more firmly into shoulder 12.

It will be noted from the above description that during the pressing operation, the wheel itself acts as one of the die members of the press. This is an important feature of my invention as it eliminates the need for a separate female die member which would otherwise be required to cause the curling of the marginal edge or edges of the ring. Although in the drawings, I have shown the upper die, as constituting the male member, it should be understood that the invention is not limited thereby since the wheel may be used with equal success as the male die member and the upper die be used as the female member.

While I have described a trim ring which is cut to size on its inner diameter, it will readily be understood that it may be cut with its inner diameter slightly smaller than the diameter of the shoulder 12, and pressed or forced over shoulder 12 prior to the pressing operation described above. It will also be understood that the outer edge of trim ring 2 may be so designed that it will be placed under pressure in consequence of the pressing operation or not as desired. From the above description, it will be apparent to those skilled in the art that a portion of the wheel may be curled into biting engagement with the ring, and it is to be understood that such a modification comes within the scope of my invention.

From the above description it will readily be understood that I have provided a novel form of trim ring for vehicle wheels and a novel method of mounting the same thereon which is extremely simple and economical.

In Figure 4 of the drawings, I have shown a trim ring which has a different configuration than that shown in Figures 1 to 3 of the drawings but which may be attached in the same manner as described in connection with the previous figures. Referring to Figure 4, I have illustrated therein a trim ring, the cross section of which constitutes a continuous curve. Since the method and means of securing it to wheel 1 is similar in every respect to that described in connection with Figures 1 to 3, no further description thereof is deemed necessary.

Referring now to Figures 5 and 6 of the drawings, I have illustrated therein a different modification of my invention which is particularly applicable to vehicle wheels which do not have an outwardly extending shoulder at the junction point between the body part and the rim portion of the wheel. For the purposes of clarity, only a portion of the wheel assembly has been illustrated and includes a rim portion 18 and a body part 19. The rim portion includes a base flange 20, a side wall portion 21, an intermediate flange 22, and an edge portion 23. Body part 19 includes the usual laterally extending flange 24 at its outer periphery, the latter being secured to base flange 20 of rim portion 18 in any suitable manner (not shown). A preformed trim ring 25 is cut with an outer diameter slightly greater than the inner diameter of flange 22 at the point which trim ring 25 is adapted to be finally secured. A die 26 is provided for the male member of the press (not shown) which snugly fits the outer surface of trim ring 25 with the exception of a small portion of the latter near its outer marginal edge. The die at this point is cut slightly away from ring 25 for a purpose which will presently be explained.

The manner of assembling trim ring 25 on rim portion 18 is as follows:

The wheel upon which a trim ring is about to be mounted is placed in a press and a trim ring 25 is placed in position as shown in Figure 5. Die 26 is then brought to bear against ring 25 and pressure is applied to the press in an axial direction as is indicated by the arrow in the drawings. As die 26 is moved forwardly, the outer marginal edge 27 of ring 25 is slightly curled or bent until it assumes the position illustrated in Figure 6 of the drawings. By reason of the slightly curled edge or angle at which marginal edge 27 contacts flange 22 and rim portion 18, a biting engagement is made between trim ring 25 and rim 18. In order to enhance the general appearance of trim ring 25, its inner edge 28 is underturned as shown in Figures 5 and 6 of the drawings. Underturned edge 28 is so positioned relative to the other elements of the wheel assembly that when trim ring 25 has assumed its final position, edge 28 presses against outer rim wall 21, preferably under a slight pressure. The final position assumed by trim ring 25 may best be seen in Figure 6 of the drawings which indicates the respective position of the various elements at the end of the pressing operation.

While I have described the above modification of my invention in connection with a wheel which is not provided with a shoulder at the junction point of the body part and the rim portion of the wheel, it will readily be understood that a trim ring may be applied in the above described manner to a wheel which is provided with such a shoulder.

A third modification of my invention is shown in Figures 7 and 8. For purposes of clarity, those elements which are similar in every respect to corresponding elements of Figures 5 and 6 have been given the same reference numerals. In this case, a trim ring 29 is provided which has an intermediate indented portion or flange 30 which is adapted to be expanded during the pressing operation to force the marginal edge 31 of the ring into biting engagement with rim 18. As will be noted upon inspection of the drawings, the outer diameter of trim ring 29 prior to the assembly operation is slightly less in diameter than the inner diameter of flange 22 at the point where the biting engagement is to be made. The inner marginal edge 32 of trim ring 29 is underturned as was the case in connection with the modification shown in Figures 5 and 6.

Ring 29 is assembled on rim 18 in the following manner:

Ring 29 is placed on the wheel in the position shown in Figure 7 and axial pressure is applied to the form fitting die 26. As die 26 moves downwardly with respect to the wheel, indented portion 30 is expanded in substantially a radial direction, thereby causing marginal edge 31 to be forced into biting engagement with flange 22 of rim 18. Indented portion 30 is also forced against side wall 21 under a slight pressure as is the inner marginal edge 32 of the ring. The position of ring 29 with respect to the other elements of the wheel, at the end of the pressing operation, may be seen best in Figure 8 of the drawings.

While I have shown particular embodiments of my invention, it will of course be understood that I do not wish to be limited thereto since many other modifications may be made, and I therefore contemplate by the appended claims to cover all such modifications as fall within the true spirit and scope of my invention.

I claim as my invention:

1. In the assembly of vehicle wheels of the type having a tortuous configuration, the method of mounting trim rings thereon which includes stressing one of the marginal edges of said ring to curl and turn its extremity into biting engagement with said wheel on a portion of its tortuous surface upon application of pressure to said ring in substantially an axial direction.

2. The method of mounting trim rings on wheels which includes applying pressure over a substantial portion of said ring, and distorting a marginal edge of said ring to curl and turn the extremity of said edge into biting engagement with a portion of said wheel during said pressing operation.

3. With vehicle wheels of the type which includes a rim portion and a body part, said body part having a substantially axially extending shoulder in proximity to the junction point of said body part with said rim portion, a method of mounting trim rings on said wheels which includes placing a ring over the shoulder and then stressing the inner marginal edge of the ring to turn and curl itself against the shoulder.

4. In the assembly of vehicle wheels of the type which includes an outwardly extending circular flange and a substantially axially extending annular flange at the outer edge of said first flange with trim rings whose outer diameter is greater than the inner diameter of said axially extending flange, the method of securing said trim rings to said wheels between said first and second flanges which includes forcing said ring into said axially extending flange and during the same forcing operation causing the outer marginal edge of said trim ring to be bent in a slightly outwardly direction, whereby said trim ring bites into engagement with said axially extending flange and is securely held thereby.

5. The method of mounting a trim ring on a vehicle wheel by means of a press which includes applying an axial pressure therebetween to cause a marginal edge of said ring to turn and curl into biting engagement with said wheel, and using said wheel as one of the die members of said press.

6. In the assembling of trim rings on vehicle wheels, the method which includes placing a ring on a wheel and then stressing by pressure in excess of manual pressure one of the peripheral edges of the ring to expand the edge in its entirety in a radial direction, whereby a biting engagement is made by the ring with the wheel.

7. In the assembling of trim rings of the type having an intermediate indented portion on vehicle wheels, the rings being substantially preformed prior to assembly, the method which includes placing a ring on a wheel, and then applying an axial pressure to the indented portion of the ring to cause the ring to expand in a substantially radial direction, whereby a biting engagement is made between the ring and the wheel.

8. The method of securing a thin sheet metal trim ring to a wheel having a shoulder next to and at an angle to a conical surface which comprises placing the trim ring on the wheel with a curled edge portion in tangential contact with the conical surface on the wheel and loose abutting contact with the shoulder, supporting a large portion of the ring near the line of tangential contact with the wheel but leaving a narrow unsupported band between said line of tangential contact and said supported portion, and forcing the ring against the conical surface of the wheel so as to cause the conical wheel surface to curl the narrow unsupported band of the ring and force the edge of the ring into tight abutting contact with the shoulder.

9. In a vehicle wheel including a rim part and a body part, said rim part including an outwardly extending flange portion, an ornamental annular trim ring adapted for disposition on said flange portion of the rim part, said trim ring having resilient retaining means projecting from an inner marginal portion of said ring to bear against the rim part and constructed and arranged to retainingly grip the body part.

10. In a vehicle wheel including a rim part and a body part, said rim part including an outwardly extending flange portion, an ornamental annular trim ring adapted for disposition on said flange portion of the rim part, said trim ring having retaining means projecting from an inner marginal portion of said ring adapted to bear against the wheel rim part and constructed and arranged to retainingly grip the body part.

GEORGE ALBERT LYON.